US008589250B2

(12) United States Patent
Noy et al.

(10) Patent No.: US 8,589,250 B2
(45) Date of Patent: Nov. 19, 2013

(54) SYSTEM, METHOD AND COMPUTER PROGRAM PRODUCT FOR PREDICTING VALUE OF LEAD

(75) Inventors: Oded Noy, Mar Vista, CA (US); Jason McBride, Santa Monica, CA (US); William Lepler, Sherman Oaks, CA (US); Scott Painter, Bel Air, CA (US)

(73) Assignee: Truecar, Inc., Santa Monica, CA (US)

( * ) Notice: Subject to any disclaimer, the term of this patent is extended or adjusted under 35 U.S.C. 154(b) by 412 days.

(21) Appl. No.: 12/655,462

(22) Filed: Dec. 30, 2009

(65) Prior Publication Data

US 2011/0161197 A1 Jun. 30, 2011

(51) Int. Cl.
*G06Q 30/00* (2012.01)

(52) U.S. Cl.
USPC .......................................... 705/26.4

(58) Field of Classification Search
USPC .......................... 705/26, 26.1, 26.4
See application file for complete search history.

(56) References Cited

U.S. PATENT DOCUMENTS

| 5,842,178 | A | 11/1998 | Givannoli |
| 6,041,310 | A | 3/2000 | Green |
| 6,868,389 | B1 | 3/2005 | Wilkins |
| 7,050,982 | B2 | 5/2006 | Sheinson |
| 7,676,400 | B1 | 3/2010 | Dillon |
| 2003/0105728 | A1* | 6/2003 | Yano et al. ................ 705/400 |
| 2003/0171964 | A1 | 9/2003 | Center |
| 2005/0108112 | A1 | 5/2005 | Ellenson |
| 2005/0159996 | A1 | 7/2005 | Lazarus et al. |
| 2005/0171859 | A1 | 8/2005 | Harrington |
| 2005/0234688 | A1 | 10/2005 | Pinto et al. |
| 2006/0085283 | A1 | 4/2006 | Griffiths |
| 2006/0129423 | A1 | 6/2006 | Sheinson |
| 2006/0200360 | A1 | 9/2006 | Razletovskiy |
| 2007/0130090 | A1* | 6/2007 | Staib et al. ................ 705/400 |
| 2007/0226081 | A1 | 9/2007 | Vilcauskas |
| 2007/0244797 | A1 | 10/2007 | Hinson |
| 2008/0201203 | A1* | 8/2008 | Rose et al. ................ 705/10 |
| 2008/0255965 | A1 | 10/2008 | Milton |
| 2008/0300962 | A1 | 12/2008 | Cawston |
| 2008/0306812 | A1* | 12/2008 | Bowen et al. ................ 705/11 |
| 2008/0306848 | A1 | 12/2008 | Bartholomew |
| 2009/0006118 | A1* | 1/2009 | Pollak ................ 705/1 |

(Continued)

OTHER PUBLICATIONS

Painter, Scott, "Car Sales Lead Generation: Broken for Consumers, Broken for Dealers", E-Commerce times, Dated Sep. 15, 2008.*

(Continued)

*Primary Examiner* — Mark Fadok
(74) *Attorney, Agent, or Firm* — Sprinkle IP Law Group (57) ABSTRACT

Embodiments disclosed herein provide a solution in determining a lead value and making an introduction accordingly. In some embodiments, in response to a consumer's search request for a retail item within a geographical area, a decision system may obtain from a local database a list of dealers capable of provisioning the retail item—such as a new or used vehicle—at various locations within the geographical area. For each dealer, the system may calculate a dealer score across a plurality of tests and set a dollar value to an introduction utilizing the dealer score associated therewith. The performance measures of the tests may be normalized and adjusted utilizing a set of coefficients. The list of dealers may be sorted per dollar value of introduction and presented to the consumer. To provide more accurate dealer evaluations, the system may periodically reset the set of coefficients using sales data.

20 Claims, 5 Drawing Sheets

(56) References Cited

U.S. PATENT DOCUMENTS

| | | | |
|---|---|---|---|
| 2009/0018888 A1 | 1/2009 | Zamani | |
| 2009/0254454 A1 | 10/2009 | Gupta | |
| 2009/0287534 A1* | 11/2009 | Guo et al. | 705/10 |
| 2009/0287595 A1* | 11/2009 | Hanifi | 705/37 |
| 2010/0153184 A1 | 6/2010 | Caffrey et al. | |
| 2010/0161379 A1 | 6/2010 | Bene et al. | |
| 2010/0183132 A1 | 7/2010 | Satyavolu et al. | |

OTHER PUBLICATIONS

Lead generation—buy top quality sales leads from car buyers, Retrieved from the Internet on Oct. 20, 2009:< URL: http://partner.askaprice.com/buy_leads/ >,2 pages.

Used and New Car Leads for Car Dealers—Special Budget friendly . . . Retrieved from the Internet on Oct. 20, 2009:< URL: http://www.automotiveleads.com >,2 pages.

CRM News: E-Commerce: Car Sales Lead Generation: Broken for C . . . Retrieved from the Internet:< URL on Oct. 20, 2009: http://www.crmbuyer.com/story/64475.html?wlc=1256049248 >,4 pages.

International Search Report and Written Opinion issued for PCT Application No. PCT/US2012/044416, mailed Sep. 12, 2012, 11 pages.

* cited by examiner

SYSTEM, METHOD AND COMPUTER PROGRAM PRODUCT FOR PREDICTING VALUE OF LEAD

TECHNICAL FIELD OF THE DISCLOSURE

The present disclosure relates generally to predicting the value of a lead and, more particularly, to making introduction between a buyer and a seller based on the predicted value of the lead. Even more particularly, the present disclosure is related to optimizing the introduction based on the likelihood of the buyer to purchase a thing of value such as an automobile from the seller.

BACKGROUND OF THE DISCLOSURE

Geographic proximity is no longer the primary driver of auto purchases. In recent years, virtual dealerships have sprung up all over the Internet. When consumers go online to buy a car, there are usually multiple dealers that can sell a car to them. Intermediary consumer-oriented service providers typically have several automotive dealers in their system to which they can introduce to a customer.

Examples of the types of introductions may include an introduction for in-network dealers and an introduction for non-network dealers, and so on. In-network dealers may be those that have agreed to be in the intermediary service provider's network. For example, in-network dealers may agree to pay the intermediary service provider a fee for an introduction to a customer that ended up purchasing a vehicle, after the purchase is made. This is sometimes referred to as Pay-Per-Sale. Currently, there is not a standardized way to operate in this marketplace. Customers may visit multiple online solution providers, including automotive research sites, lead generation providers, etc., for their vehicle purchasing needs.

Existing solutions are believed to be lacking or have drawbacks in at least the following main areas: (1) leads are generally purchased in bulk where all leads in the same group or category have the same price; 2) the determining factors on which dealers should be presented to which customers are generally based on a simple set of considerations; and (3) little or no access to historical information across a wide consumer base. As more and more consumers now surf the Internet to find deals, there is always room for improvement.

SUMMARY OF THE DISCLOSURE

Embodiments disclosed herein can provide a predictive value for each introduction between a potential buyer and a dealer within a dealer network. For illustrative purposes, embodiments disclosed herein describe a car dealer network where various types of vehicles may be available for purchase and/or lease. Those skilled in the art can appreciate that embodiments disclosed herein may be readily adapted for other types of dealer networks, including, but not limited to, a boat dealer network, a high end kitchen appliance dealer network, a bicycle dealer network, a recreational vehicle network, etc.

Some embodiments disclosed herein may enable an intermediary online solution provider to make a meaningful introduction that likely turns into a sale, on an item-by-item basis, between a potential customer and a dealer. A non-exhaustive list of factors, such as those listed below, may influence how a meaningful introduction can be made:

Which, if any, dealer(s) in the area should be introduced to a particular customer?

If multiple dealers should be introduced to a customer, at what order should the dealers be introduced?

Where multiple types of introduction are available, which dealer should be introduced in which form?

To address these issues, some embodiments disclosed herein may be implemented as a publicly-accessible Web site having suitable software running on one or more server machines for determining which dealer or dealers to introduce to a potential buyer, based on a predictive value of such an introduction within a dealer network.

More specifically, a Web site implementing an embodiment disclosed herein may comprise the following functions, some of which may be optional:

1) Recommendation Engine.

In some embodiments, the following variables may be used to generate a dealer recommendation to a potential customer:

Price compression
Price distribution
Dealer location

In one embodiment, a dealer recommendation method may comprise 1) collecting data on price compression, price distribution, and dealer location; 2) applying weighting to each variable; and 3) tuning the variables using one or more machine-learning techniques. In some embodiments, the data collected may include historical values over a certain period of time at or around the dealer location. In some embodiments, the weighting applied to each variable is tunable and/or user definable.

2) Variable-Cost of Leads.

In some embodiments, every lead may have its own price. Some embodiments disclosed herein may determine a lead purchase price on a lead-by-lead basis utilizing a plurality of factors, including, but not limited to, the purchase price set by a buyer. Some embodiments may utilize a statistical analysis by a buyer of information about the underlying lead itself to determine the statistical likelihood of a sale actually occurring based on a particular lead.

In one embodiment, the statistical analysis by a buyer of information may be performed using the aforementioned dealer recommendation engine to recommend the lead to a particular car dealer and using the historical close rates on leads recommended using the dealer recommendation engine.

3) What to Display and Optimized Order of Display.

Determine which dealers should be displayed to the buyer—with the highest likelihood to submit a lead, and then purchase a car from the presented dealer. For example, rather than using a single and simpler rubric such as price or distance, some embodiments may use predictive data to determine the optimal order of presentation of dealers to a potential car buyer. This results in a better conversion of potential car buyers to leads and ultimately a higher monetization of the vehicle inquiry. Some embodiments may also present a blend of dealerships from a dealer network and lead generation dealerships based on price. The cohort of dealers may self-reinforce the sale to the user by skillfully presenting comparisons to make the ultimate choice easier 4) Performance-Based Lead Sales.

Predict the likely cash value of a single selection point (i.e., a single online customer looking to buy a single item). As each lead may be priced individually, dealers may bid on the chance of being introduced to such a customer. This introduction-by-introduction basis allows the intermediary solution provider to place each individual introduction in an open market competitive environment. For example, some embodiments may calculate and offer dynamic bids on leads in the open market based on a potential car buyer's location and vehicle request. By contrast, the traditional approach for lead sellers is to offer a single, static price for a lead. Conventional lead generation systems usually provide lead pricing for a category of leads.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions and/or rearrangements may be made within the scope of the disclosure without departing from the spirit thereof, and the disclosure includes all such substitutions, modifications, additions and/or rearrangements.

BRIEF DESCRIPTION OF THE DRAWINGS

The drawings accompanying and forming part of this specification are included to depict certain aspects of the disclosure. It should be noted that the features illustrated in the drawings are not necessarily drawn to scale. A more complete understanding of the disclosure and the advantages thereof may be acquired by referring to the following description, taken in conjunction with the accompanying drawings in which like reference numbers indicate like features and wherein.

DETAILED DESCRIPTION

The disclosure and the various features and advantageous details thereof are explained more fully with reference to the non-limiting embodiments that are illustrated in the accompanying drawings and detailed in the following description. Descriptions of well known hardware and software components, programming languages and programming techniques are omitted so as not to unnecessarily obscure the disclosure in detail. Skilled artisans should understand, however, that the detailed description and the specific examples, while disclosing preferred embodiments, are given by way of illustration only and not by way of limitation. Various substitutions, modifications, additions or rearrangements within the scope of the underlying inventive concept(s) will become apparent to those skilled in the art after reading this disclosure.

Software implementing embodiments disclosed herein may be implemented in suitable computer-executable instructions that may reside on a computer-readable storage medium. Within this disclosure, the term "computer-readable storage medium" encompasses all types of data storage medium that can be read by a processor. Examples of computer-readable storage media can include random access memories, read-only memories, hard drives, data cartridges, magnetic tapes, floppy diskettes, flash memory drives, optical data storage devices, compact-disc read-only memories, and other appropriate computer memories and data storage devices.

As used herein, the terms "comprises," "comprising," "includes," "including," "has," "having" or any other variation thereof, are intended to cover a non-exclusive inclusion. For example, a process, product, article, or apparatus that comprises a list of elements is not necessarily limited only those elements but may include other elements not expressly listed or inherent to such process, process, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Additionally, any examples or illustrations given herein are not to be regarded in any way as restrictions on, limits to, or express definitions of, any term or terms with which they are utilized. Instead these examples or illustrations are to be regarded as being described with respect to one particular embodiment and as illustrative only. Those of ordinary skill in the art will appreciate that any term or terms with which these examples or illustrations are utilized encompass other embodiments as well as implementations and adaptations thereof which may or may not be given therewith or elsewhere in the specification and all such embodiments are intended to be included within the scope of that term or terms. Language designating such non-limiting examples and illustrations includes, but is not limited to: "for example," "for instance," "e.g.," "in one embodiment," and the like.

Figure 1:
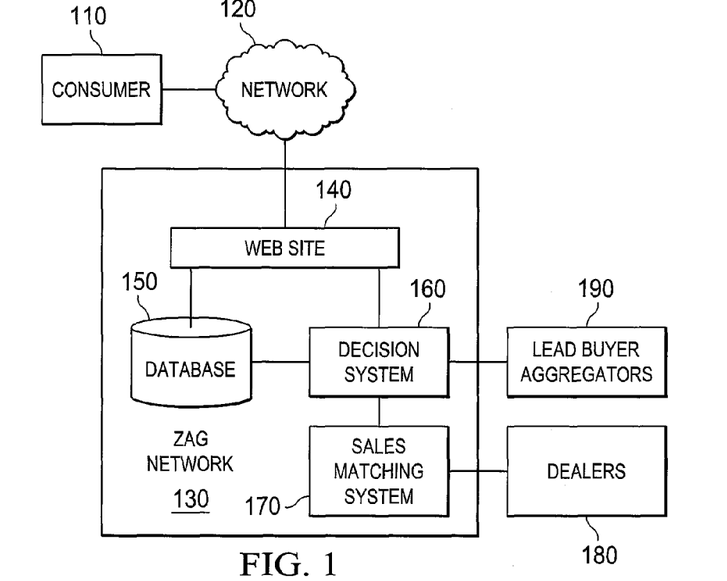
FIG. 1 is a simplified diagrammatic representation of one example embodiment of a system for predicting the value of a lead.

FIG. 1 is a simplified diagrammatic representation of example system 100 comprising enterprise computing environment or network 130 of an online solution provider Zag. As illustrated in FIG. 1, computer user or consumer 110 may interact with Web site 140 to conduct their car research and perhaps purchase a new or used vehicle through Web site 140. In one embodiment, the user's car buying process may begin when the user directs a browser application running on the user's computer to send a request over network 120 to Web site 140. The user's request may be processed through decision system 160 coupled to Web site 140.

In some embodiments, decision system 160 may be capable of determining the user's likelihood to buy and the dollar value of certain dealers known to decision system 160. In some embodiments, information about dealers known to decision system 160 is stored on database 150 coupled to decision system 160 as shown in FIG. 1.

In some embodiments, the decision system may be implemented as a recommendation engine capable of determining a list of dealers to present to the user based on the user's likelihood to buy and the dollar value of the dealers presented. In one embodiment, the list of dealers may be displayed to the user via a user interface.

In some embodiments, calculations by decision system 160 may be based on information from a plurality of system components, including data from sales matching system 170, a list of available dealers and their performance history from database 150 and/or dealers 180, and individual bids offered by Lead Buyer Aggregators 190. Examples of specific calculations by decision system 160 are described below with reference to FIGS. 3-6.

Figure 2:
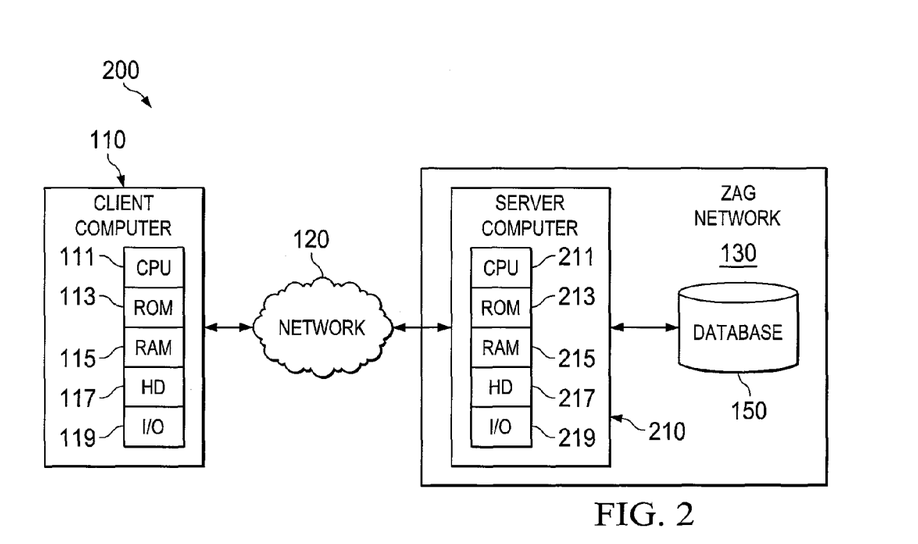
FIG. 2 is a simplified diagrammatic representation of one example network architecture in which embodiments disclosed herein may be implemented.

FIG. 2 is a simplified diagrammatic representation of one example network architecture 200 in which embodiments disclosed herein may be implemented. For simplification, a single client computer and a single server computer are shown in FIG. 2, representing an example hardware configuration of data processing systems capable of bi-directionally communicating with each other over a public network such as the Internet. Those skilled in the art will appreciate that enterprise computing environment 130 may comprise multiple server computers and multiple client computers may be bi-directionally coupled to Web site 140 over network 120. Web site 140 may be hosted by server computer 210 in enterprise computing environment 130.

Client computer 110 can include central processing unit ("CPU") 111, read-only memory ("ROM") 113, random access memory ("RAM") 115, hard drive ("HD") or storage memory 117, and input/output device(s) ("I/O") 119. I/O 119 can include a keyboard, monitor, printer, and/or electronic pointing device. Example of I/O 119 may include mouse, trackball, stylist, or the like. Client computer 110 can include a desktop computer, a laptop computer, a personal digital assistant, a cellular phone, or nearly any device capable of communicating over a network. Server computer 210 may have similar hardware components including CPU 211, ROM 213, RAM 215, HD 217, and I/O 219.

Each computer shown in FIG. 2 is an example of a data processing system. ROM 113 and 213, RAM 115 and 215, HD 117 and 217, and database 150 can include media that can be read by CPU 111 and/or 211. Therefore, these types of computer memories include computer-readable storage media. These memories may be internal or external to computers 110 and/or 210.

Portions of the methods described herein may be implemented in suitable software code that may reside within ROM 213, RAM 215, HD 217, database 150, or a combination thereof. In some embodiments, computer instructions implementing an embodiment disclosed herein may be stored on a DASD array, magnetic tape, floppy diskette, optical storage device, or other appropriate computer-readable storage medium or storage device. A computer program product implementing an embodiment disclosed herein may therefore comprise one or more computer-readable storage media storing computer instructions translatable by CPU 211 to perform an embodiment of a method disclosed herein.

In an illustrative embodiment, the computer instructions may be lines of compiled C++, Java, or other language code. Other architectures may be used. For example, the functions of server computer 210 may be distributed and performed by multiple computers in enterprise computing environment 130. Accordingly, each of the computer-readable storage media storing computer instructions implementing an embodiment disclosed herein may reside on or accessible by one or more computers in enterprise computing environment 130.

In some embodiments, the various software components and subcomponents, including Web site 140, database 150, decision system 160, and sales matching system 170, may reside on a single server computer or on any combination of separate server computers. In some embodiments, some or all of the software components may reside on the same server computer.

Figure 3:
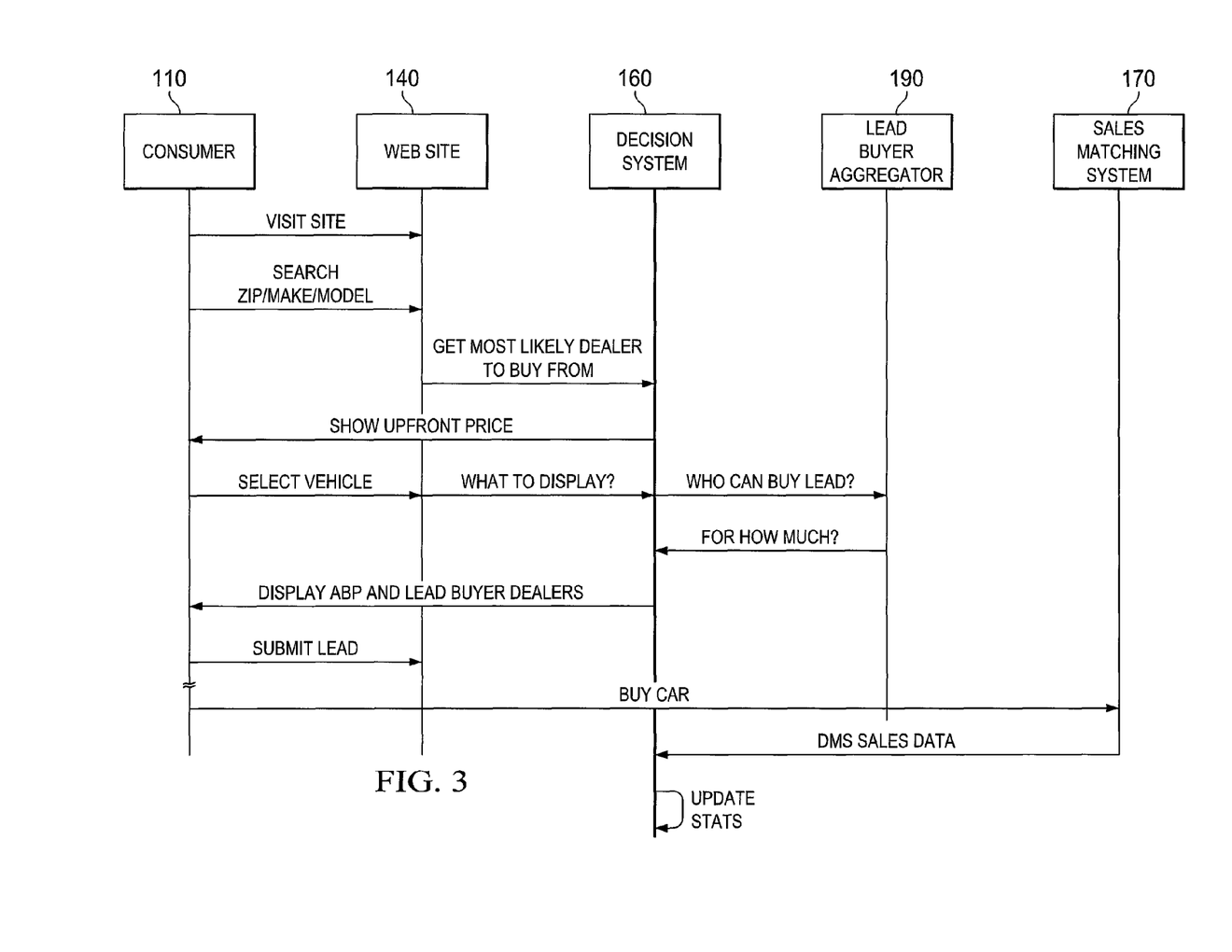
FIG. 3 is a diagrammatic representation of one example embodiment of system interaction.

FIG. 3 is a diagrammatic representation of one example embodiment of system interaction. In embodiments disclosed herein, decision system 160 may interact with a plurality of components to determine the best response to a particular user's request so that a meaningful introduction can be made and likely be turned into a sale. In one embodiment, these interactions may be housed in database 150 coupled to decision system 160.

In one embodiment, decision system 160 is engaged when consumer 110 visits Web site 140 and conducts a search with a set of search criteria. Examples of search criteria may include zip code, a vehicle make, year, and model, etc.

As a specific example, in one embodiment, consumer 110 may provide Web site 140 with a specific zip code and a particular vehicle make and model. In one embodiment, decision system 160 may search database 150 and determine a dealer from which this specific user is most likely to buy and returns a price that the user most likely will pay for the specified vehicle. This is known as upfront pricing. Advantages of upfront pricing may be found in an article by Scott Painter, "Car Sales Lead Generation: Broken for Consumers, Broken for Dealers," E-Commerce Times, Sep. 15, 2008, 4 pages, the entire content of which is incorporated herein by reference.

In some embodiments, once consumer 110 selects a vehicle, indicating their intention to buy, decision system 160 may operate to determine which dealers to display by identifying in-network dealers 180 near consumer 110. In one embodiment, decision system 160 may operate to determine which dealers may buy this particular lead associated with consumer 110. In one embodiment, decision system 160 may operate to determine how much lead aggregators 190 may pay for this particular lead.

In some embodiments, if consumer 110 selects one or more dealers, decision system 160 may operate to submit consumer 110's lead to those dealers 180 or lead aggregators 190. In one embodiment, sales matching system 170 may operate to match submitted leads to sales reported by dealers via DMS Sales Data files. In one embodiment, if consumer 110 buys a car, sales matching system 170 may operate to match that sale to a lead and update the stats stored in database 150 for use by decision system 160 in subsequent calculations.

Figure 4:
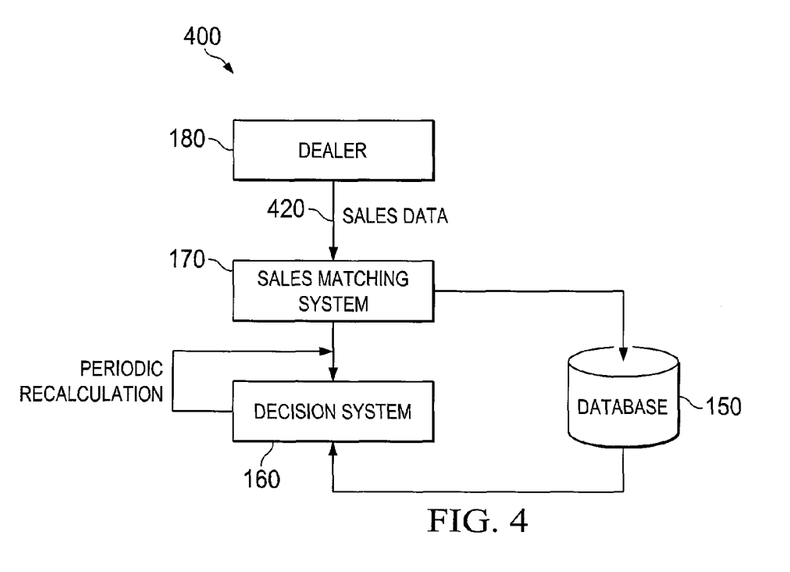
FIG. 4 is a diagrammatic representation of one example embodiment of a method of fine-tuning a plurality of tests utilized in evaluating dealers known to an intermediary online solution provider.

FIG. 4 is a diagrammatic representation of one example of a method of fine-tuning a plurality of tests utilized in evaluating dealers known to an intermediary online solution provider. In some embodiments, method 400 may comprise receiving sales data 420 at sales matching system 170 from dealer 180. As described above, sales matching system 170 may receive sales data 420 from dealer 180 after a purchase from dealer 180 is made by consumer 110. Sales matching system 170 may update database 150 with sales data 420 received from dealer 180 or may provide sales data 420 received from dealer 180 to decision system 160. In some embodiments, decision system 160 may periodically set and reset a set of coefficient weights utilizing sales data 420. This process can be useful as well as practical for some applications. For example, in order to make accurate predictions on the value of the leads on an introduction-by-introduction basis, it may be desirable to have all the statistical data initially. However, this is not a requirement. A system implementing an embodiment disclosed herein can begin with a set of historical statistical data and improves/learns over time by manipulating coefficient weights in view of sales data 420. As will be described below with reference to FIG. 5, this set of coefficient weights can then be utilized to continually evaluate in-network dealers 180.

For example, in one embodiment, decision system 160 may set and reset coefficient weights using the results of normalization, the close rate for in-network dealers, and the dollar value derived from selling leads to dealers. In one embodiment, this periodic recalculation analyzes sales data from sales matching system 170, stored leads from database 150, and DMS sales data from dealers 180 and resets coefficient weights accordingly. In one embodiment, this process is done automatically and continuously.

In one embodiment, this periodic recalculation of coefficient weights represents a learning loop for decision system 160 in evaluating in-network dealers 180 over time. In some embodiments, decision system 160 may operate to review the coefficients on a monthly basis. In some embodiments, decision system 160 may operate to re-evaluate dealers 180 on a daily basis. As a specific example, a system implementing an embodiment disclosed herein may have 2,400 dealers, all of which would be re-evaluated nightly and the system would be updated with the latest data accordingly. In some embodiments, a dealer or dealership refers to an entity capable of provisioning a retail item such as a particular new car of a certain make, model, and year—physical inventory of the same is not required. One example could be that a buyer is interested in purchasing a new mid-size sedan with a customized sports package by special order. Automotive dealerships typically do not keep a physical inventory of all the retail items that they can provision for their customers. In embodiments disclosed herein, it is not necessary to review against items in each dealership's physical inventory and the physical inventory at a particular dealership has no effect on the evaluation of that dealership.

Figure 5:
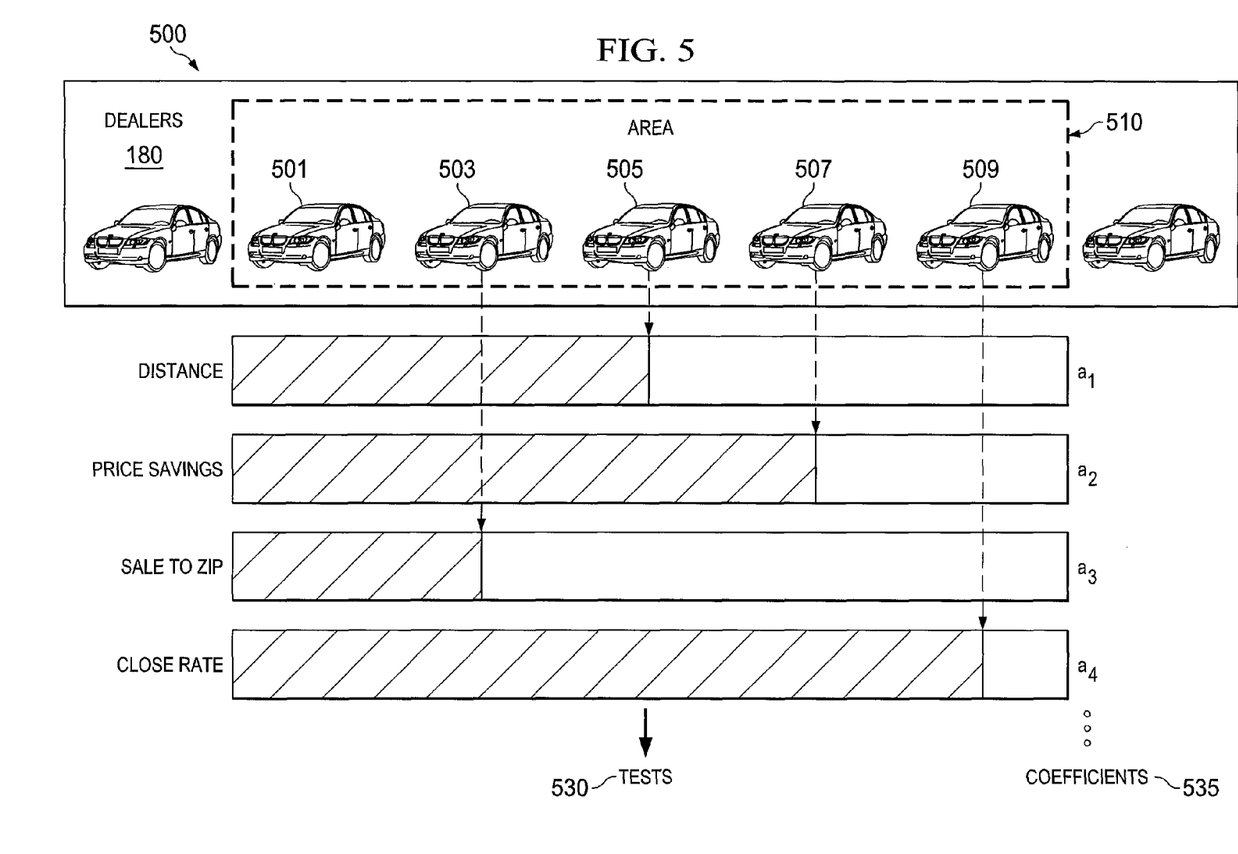
FIG. 5 is a diagrammatic representation of one example embodiment of a method of evaluating dealers within a range defined by a potential buyer.

FIG. 5 is a diagrammatic representation of one example of a method of evaluating dealers within a range defined by a potential buyer. As illustrated in FIG. 5, in one embodiment, system 500 may evaluate all the dealers available for a given user's search through a set of tests 530. In this example, suppose an address or a zip code provided by consumer 110 defines geographical area or range 510 and dealers 501, 503, 505, 507, and 509 from in-network dealers 180 are located at various physical locations within area 510. Using a number of coefficients 535, represented by $a_1, a_2, a_3, a_4, \ldots$, system 500 may normalize a dealer's performance measures and variables to make more meaningful comparisons for a given search request. The coefficients can be modified and the effect of these changes can be measured as system 500 learns to assign optimal weights to coefficients 535. Example calculations for normalization and coefficients are described below in further detail with reference to FIG. 6. These coefficients may differ from implementation to implantation. For example, in one market, the coefficients may represent considerations such as Distance, Price Savings, Sales to a particular Zip code, and the Close Rate of a particular dealer. In another market, the coefficients may represent a different set of considerations. As another example, system 500 may test different sets of coefficients representing different sets of considerations for the same market. The coefficients may also differ for various reasons. For example, system 500 may test different coefficients for different makes of vehicle. Additional conditions may also affect how system 500 tests the coefficients and/or what coefficients are tested.

In some embodiments, the system may consider primary variables and secondary factors. An example of a primary variable may be the physical distance between the user and a particular dealership (i.e., the location of a vehicle desired by the user). In one embodiment, system 500 may perform the dealer evaluation utilizing the following variables:

Variable 1: Physical distance between a user and a dealership where the desired vehicle is located.

Variable 2: Historical sales in the last 60 days.

Variable 3: Dealer price offset (user's savings offered on a partner site).

Variable 4: All sales to buyers within 5 miles of the search zip code from this dealer. This may include direct sales and those made through one or more intermediaries.

Variable 5: Average daily internally generated leads within a distance range.

Variable 6: New car sales to dealer. This may include direct sales and those made through one or more intermediaries.

Variable 7: Potential net revenue from revenue sharing with one or more partner sites.

In one embodiment, variables 1 through 3 may be characterized as primary variables and variables 4 through 7 may be characterized as secondary factors. Other variables and/or factors may also be included.

Figure 6:
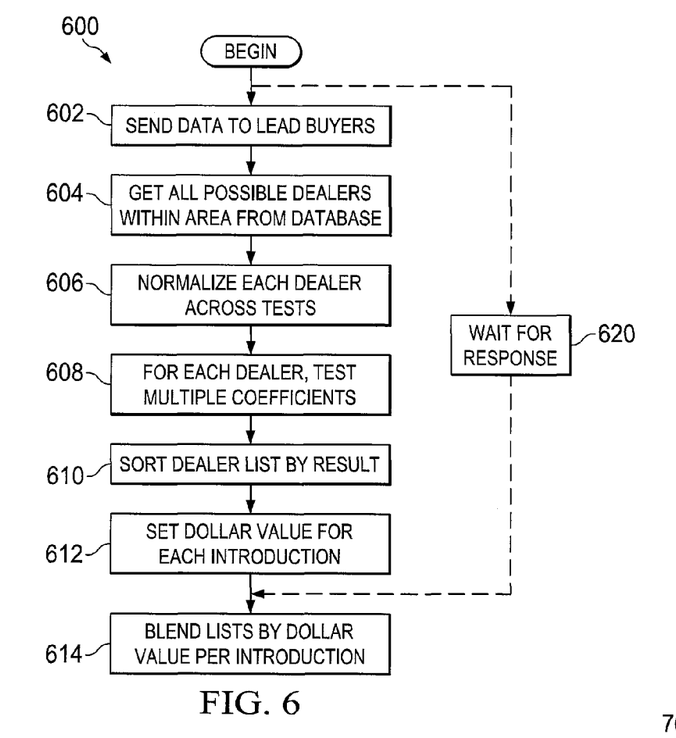
FIG. 6 is a diagrammatic representation of one example embodiment of a method of generating a list of dealers and setting a dollar value for each introduction thereof.

FIG. 6 is a diagrammatic representation of one example of a method for determining a value of an introduction. Method or flow 600 may be used by decision system 160 in response to consumer 110's search request for a Zip Code, Vehicle Make, and Vehicle Model combination. In some embodiments, decision flow 600 may send data to lead buyers 190 (step 602) and wait for a response (step 620). In some embodiments, decision flow 600 may send data to lead buyers 190 (step 602) and get all possible dealers within area 510 from database 150 (step 604). Decision flow 600 may normalize each dealer within area 510 across tests 530 (step 606) and test multiple coefficients for each dealer (step 608). Decision flow 600 may then sort a list of dealers to which consumer 110 is to be introduced (step 610) and set, for example, a dollar value for each introduction (step 612). Decision flow 600 may blend lists, for example, by dollar value per introduction (step 614). In one embodiment, the lists may blend with a response from step 620.

The specific set of tests performed by the underlying system on a set of in-network dealers within a range defined by a user may vary from implementation to implementation. In some embodiments, the user is provided with a set of choices via a user interface implementing an embodiment disclosed herein. Each choice may represent a particular combination of variables. For example, one choice may include all makes, territories and program affinity groups (PAGS) and one choice may be based on a specific make, model, and trim package.

In embodiments disclosed herein, each introduction has a value associated therewith. In one embodiment, this value is a dollar value. The value of a particular introduction is determined based in part on a particular dealer's score. In embodiments disclosed herein, each dealer within a search range may be scored utilizing the sum of multiplying each coefficient with its normalized value such that:

$$\text{Dealer score} = N_1 \times C_1 + N_2 \times C_2 + \ldots + N_x \times C_x,$$

where $N_x$ represents the normalized value between 0 and 1 per test and $C_x$ represents the coefficient for that market/make (or other parameter) combination.

In this case, the dollar value for an introduction is then the product of the dealer score, the score confidence, and the dollar per car sold:

$$\text{Dollar value for an introduction} = \text{dealer score} \times \text{score confidence} \times \text{dollar per car sold}.$$

Example Calculations

As a specific example, all variables are normalized with the highest member of the cohort (comparison group of dealers) receiving 1 and the lowest receiving 0. In one embodiment, coefficients for the variables may be derived by taking each variable score on a dealer basis and weighting according to the following scheme:

$$\text{average}\left(\sum_{\text{variable }1-7}\begin{array}{l}\text{variable }i*1\text{ for lead}\\\text{variable }i*3\text{ for sales}\\\text{variable }i*0\text{ for no lead}\end{array}\right)=\text{raw }\beta.$$

In one embodiment, coefficients may be derived and normalized by:

$$\frac{\text{average (raw }\beta x)}{\min(\text{raw }\beta 1:\text{raw }\beta 7)}=\beta x.$$

In one embodiment, algorithm score may be calculated as follows:

$$\gamma(\text{dealer score})=\sum_{i=7}^{i=1}(\beta i*\alpha i).$$

Figure 7:
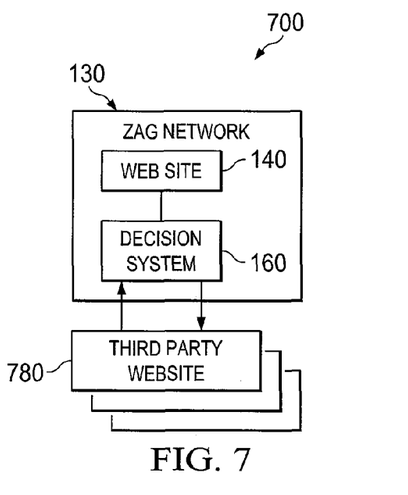
FIG. 7 is a diagrammatic representation of one example embodiment of a system for transacting leads with third parties on an item-by-item basis in an open market.

FIG. 7 is a diagrammatic representation of one example embodiment of a system for transacting leads with third parties on an item-by-item basis in an open market. In Open Market model 700, decision system 160 may be contacted by third party Web site 780 as a result of a consumer search via Web site 780 for a Zip Code, Vehicle Make, and Vehicle Model combination. In this example, decision system 160 may return a response to third party Web site 780 with information on dealer coverage. If dealer coverage exists, decision system 160 may return dealer information, vehicle price, and the lead's dollar value.

Although the present disclosure has been described in detail herein with reference to the illustrative embodiments, it should be understood that the description is by way of example only and is not to be construed in a limiting sense. It is to be further understood, therefore, that numerous changes in the details of the embodiments disclosed herein and additional embodiments will be apparent to, and may be made by, persons of ordinary skill in the art having reference to this description. Accordingly, the scope of the present disclosure should be determined by the following claims and their legal equivalents.

What is claimed is:

1. A method of determining a value of a lead and making an introduction based thereon, comprising:
   receiving at a server computer hosting a Web site a request from a browser application running on a client device of a consumer, wherein the request contains information about a retail item and a geographical area;
   extracting, by the server computer, the information about the retail item and the geographical area from the request;
   obtaining, by the server computer from a database coupled to the server computer, a list of dealers capable of provisioning the retail item at various locations within the geographical area;
   determining, by the server computer, a dollar value of making an introduction between each of the dealers and the consumer, wherein the dollar value of making an introduction between a dealer and the consumer is determined utilizing a dealer score associated with the dealer and the dealer score is calculated based at least in part on a close rate for the dealer and a dollar value associated with the retail item;
   sorting, by the server computer, the list of dealers per their corresponding, individual dollar value of making an introduction; and
   presenting the sorted list of dealers to the consumer via the client device.

2. The method according to claim 1, further comprising:
   for each of the dealers, calculating the dealer score across a plurality of tests.

3. The method according to claim 2, further comprising testing multiple coefficients for each of the dealers.

4. The method according to claim 1, further comprising periodically re-evaluating the list of dealers utilizing data from previous sales associated therewith.

5. A computer program product comprising at least one computer-readable storage medium storing computer instructions translatable by a processor to perform:
   receiving at a server computer hosting a Web site a request from a browser application running on a client device of a consumer, wherein the request contains information about a retail item and a geographical area;
   extracting, by the server computer, the information about the retail item and the geographical area from the request;
   obtaining, by the server computer from a database coupled to the server computer, a list of dealers capable of provisioning the retail item at various locations within the geographical area;
   determining, by the server computer, a dollar value of making an introduction between each of the dealers and the consumer, wherein the dollar value of making an introduction between a dealer and the consumer is determined utilizing a dealer score associated with the dealer and the dealer score is calculated based at least in part on a close rate for the dealer;
   sorting, by the server computer, the list of dealers per their corresponding, individual dollar value of making an introduction; and
   presenting the sorted list of dealers to the consumer via the client device.

6. The computer program product of claim 5, wherein the computer instructions are further translatable by the processor to perform:
   for each of the dealers, calculating the dealer score across a plurality of tests.

7. The computer program product of claim 6, wherein the computer instructions are further translatable by the processor to perform:
   testing multiple coefficients for each of the dealers.

8. The computer program product of claim 5, wherein the computer instructions are further translatable by the processor to perform:
   periodically re-evaluating the list of dealers utilizing data from previous sales associated therewith.

9. A system for making an introduction on a lead-by-lead basis, comprising:
   a processor; and
   at least one computer-readable storage medium storing computer instructions translatable by the processor to perform:
      receiving at a server computer hosting a Web site a request from a browser application running on a client device of a consumer, wherein the request contains information about a retail item and a geographical area;
      extracting, by the server computer, the information about the retail item and the geographical area from the request;

obtaining, by the server computer from a database coupled to the server computer, a list of dealers capable of provisioning the retail item at various locations within the geographical area;

determining, by the server computer, a dollar value of making an introduction between each of the dealers and the consumer, wherein the dollar value of making an introduction between a dealer and the consumer is determined utilizing a dealer score associated with the dealer and the dealer score is calculated based at least in part on a close rate for the dealer;

sorting, by the server computer, the list of dealers per their corresponding, individual dollar value of making an introduction; and presenting the sorted list of dealers to the consumer via the client device.

10. The system of claim 9, wherein the computer instructions are further translatable by the processor to perform:
for each of the dealers, calculating the dealer score across a plurality of tests.

11. The system of claim 10, wherein the computer instructions are further translatable by the processor to perform:
testing multiple coefficients for each of the dealers.

12. The system of claim 9, wherein the computer instructions are further translatable by the processor to perform:
periodically re-evaluating the list of dealers utilizing data from previous sales associated therewith.

13. The method according to claim 1, wherein the dollar value of making an introduction comprises the dealer score, multiplied by a score confidence, multiplied by a dollar amount per car sold.

14. The method according to claim 1, further comprising weighting one or more variables in a calculation of the dollar value of making an introduction, wherein variables associated with no lead are given a 0 weight, and variables associated with a sale are given a greater weight than variables associated with a lead.

15. The method according to claim 2, wherein the plurality of tests include distance, price savings, sales to a particular zip code, and the close rate of a particular dealer.

16. The computer program product of claim 5, wherein the dollar value of making an introduction comprises the dealer score, multiplied by a score confidence, multiplied by a dollar amount per car sold.

17. The computer program product of claim 5, wherein the computer instructions are further translatable to weight one or more variables in a calculation of the dollar value of making an introduction, wherein variables associated with no lead are given a 0 weight, and variables associated with a sale are given a greater weight than variables associated with a lead.

18. The system of claim 9, wherein the dollar value of making an introduction comprises the dealer score, multiplied by a score confidence, multiplied by a dollar amount per car sold.

19. The system of claim 9, wherein the computer instructions are further translatable to weight one or more variables in a calculation of the dollar value of making an introduction, wherein variables associated with no lead are given a 0 weight, and variables associated with a sale are given a greater weight than variables associated with a lead.

20. The system of claim 10, wherein the plurality of tests include distance, price savings, sales to a particular zip code, and the close rate of a particular dealer.

* * * * *